United States Patent [19]
Esmond

[11] 3,932,283
[45] Jan. 13, 1976

[54] FLUID EXCHANGE DEVICE

[76] Inventor: William G. Esmond, 537 Stamford Road, Baltimore, Md. 21229

[22] Filed: Apr. 13, 1971

[21] Appl. No.: 133,574

[52] U.S. Cl. ............................... 210/321; 23/258.5
[51] Int. Cl.² ......................................... B01D 31/00
[58] Field of Search ............ 210/229, 321; 23/258.5

[56] References Cited
UNITED STATES PATENTS

| | | | |
|---|---|---|---|
| 3,396,849 | 8/1968 | Lande et al. ......................... | 210/321 |
| 3,459,310 | 8/1969 | Edwards ............................. | 210/321 |
| 3,540,595 | 11/1970 | Edwards ............................. | 210/321 |
| 3,585,131 | 6/1971 | Esmohn .............................. | 210/321 |

OTHER PUBLICATIONS
Ulmschneider et al., Def. Pub. of Ser. No. 763,804 filed Sept. 30, 1968, published in 867 U.G. 748, on Oct. 21, 1969.

*Primary Examiner*—Frank A. Spear, Jr.
*Attorney, Agent, or Firm*—Diller, Brown, Ramik & Wight

[57] ABSTRACT

This disclosure relates to a fluid exchange device such as an artificial kidney, wherein controlled flow of two membranes for exchange purposes is controlled by means of a special stack of flow plates. These flow plates include first and second sets of flow plates disposed in alternating relation with the flow plates of the first set being contoured to define first flow paths, and the flow plates of the second set being plain and being telescoped within a membrane sleeve, the membrane sleeve being deformable under fluid differential pressure partially into the first flow path so as to define second flow paths between the plain flow plates and the sleeve.

2 Claims, 5 Drawing Figures

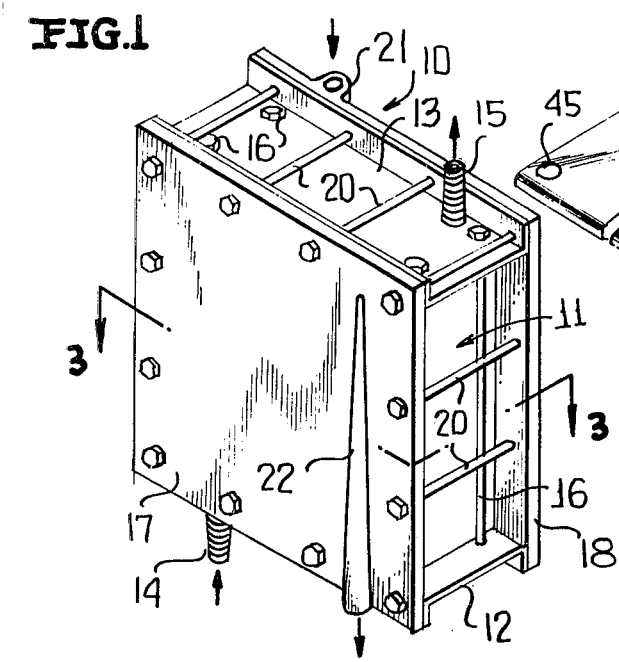
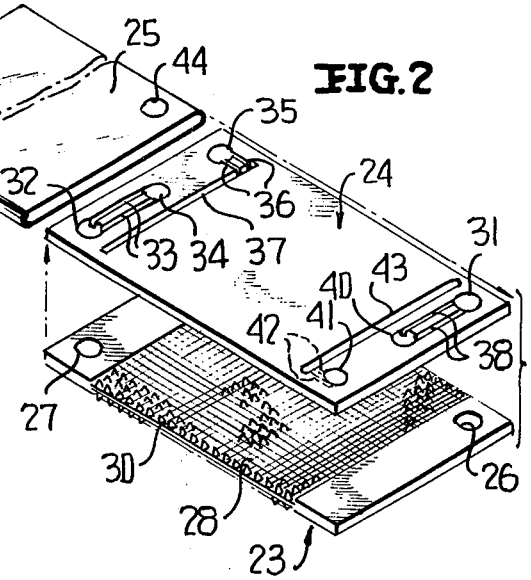
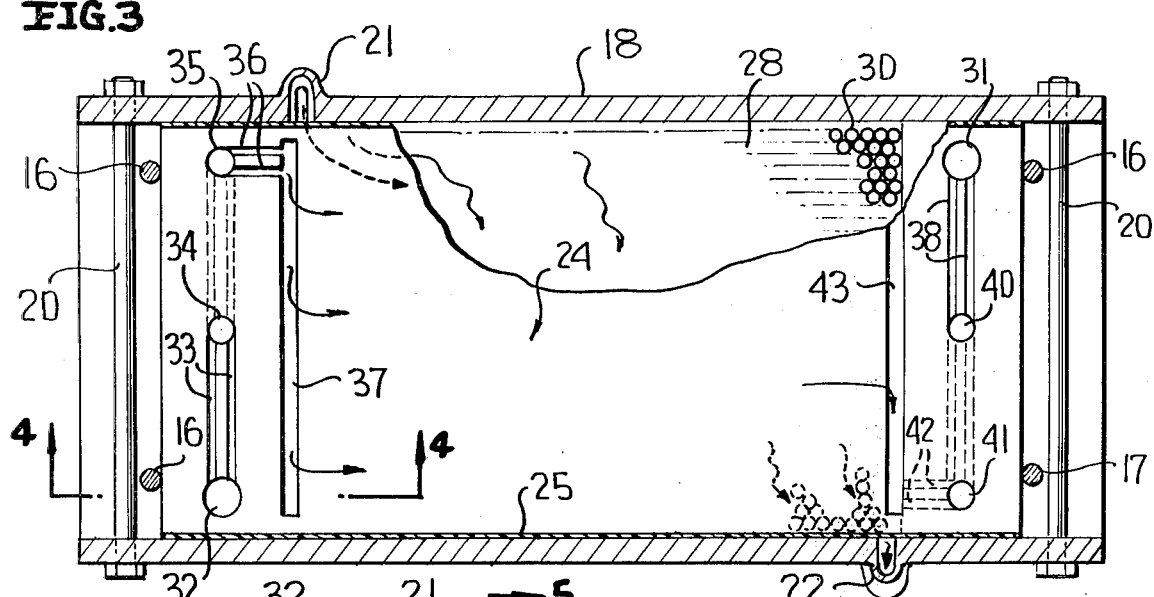
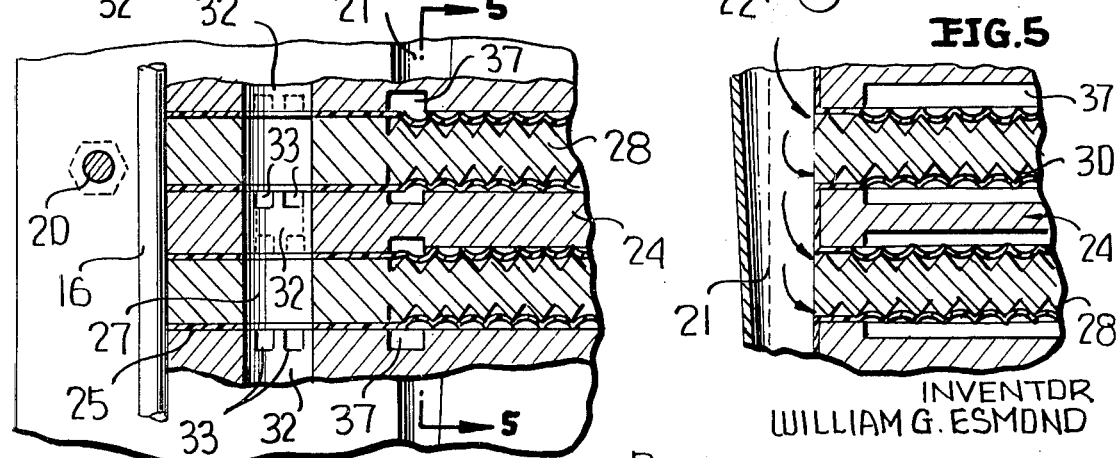

FLUID EXCHANGE DEVICE

This invention relates in general to new and useful improvements in fluid exchange devices, and more particularly to a novel artificial kidney.

BACKGROUND OF THE INVENTION

It is well known to provide fluid exchange devices, such as artificial kidneys, wherein a first fluid flows on one side of a membrane and a second fluid flows on the opposite side of the membrane. It is also well known to provide flow plates for controlling the fluid flow on opposite sides of the membrane. It is further to be understood that various types of flow plates may be provided with the efficiency of the device varying depending upon the flow plate configuration.

SUMMARY OF THE INVENTION

In accordance with this invention, it is proposed to provide a fluid exchange device wherein the flow plates thereof are of an extremely simple construction and at the same time efficient fluid flow control between the plates may be effected.

Another feature of this invention is a flowplate arrangement wherein only flow plates of a first set of flow plates need be contoured so as to define flow paths, the flow plates of the second set of flow plates being flat or planar and wherein the membrane is deformable under pressure differential partially into the flow paths defined by the contoured flow plates so as to define second flow paths.

A further feature of this invention is that the membrane may be in the form of a simple sleeve which is telescoped only over the plain flow plates, the sleeves being readily removable from the plain flow plates whereby, when desired, the flow plates may be readily cleansed and reused.

A further feature of this invention is the formation of a fluid exchange device, principally one which may utilized as in artificial kidney, wherein the device is of an extremely simple construction, relatively inexpensive to assemble, and wherein substantially all of the elements thereof, with the exception of inexpensive membrane sleeves may be reused.

With the above and other objects in view that will hereinafter appear, the nature of the invention will be more clearly understood by reference to the following detailed description, the appended claims and the several views illustrated inthe accompanying drawings:

IN THE DRAWINGS

FIG. 1 is a perspective view of the fluid exchange device.

FIG. 2 is an exploded perspective view of the two different flow plates and the membrane sleeve.

FIG. 3 is an enlarged horizontal sectional view taken along the line 3—3 of FIG. 1 and shows the specific construction of the device.

FIG. 4 is an enlarged fragmentary vertical sectional view taken along the line 4—4 of FIG. 3 and shows the details of the flow plate stack.

FIG. 5 is an enlarged fragmentary vertical sectional view taken the line 5—5 of FIG. 4 and shows fluid flow endwise between the flow plates of the stack.

Referring now to the drawings in detail, it will be seen that there is illustrated in FIG. 1 a fluid exchange device which is generally identified by the numeral 10.

The exchange device 10 is formed of a stack 11 of flow plates which are clamped together by a pair of channel shaped cross sectional manifold plates 12 and 13. The manifold plate 12 has an inlet fitting 14 while the manifold plate 13 has an outlet fitting 15. The manifold plates 12, 13 are tightly secured together in clamping engagement with the stack 11 by means of tension members 16 which may be in the form of simple bolts.

The exchange device 10 also includes a pair of manifold plates 17, 18 which are clamped to opposite sides of the stack 11 and are secured to the manifold plates 12, 13, by means of simple tension members 20 which may be in the form of simple bolts. The manifold plate 18 is provided with a fluid inlet manifold 21 which decreases in cross section downwardly while the manifold plate 17 is provided with an outlet manifold 22 which increases in cross section downwardly.

At this time it is pointed out that a first fluid is circulated through the stack 11 by means of the manifold plate 17, 18 while a second fluid is circulated through the stack 11 through the manifold plates 12, 13, the flow of the two fluids being in crossing relation for maximum exchange.

Reference is now made to FIG. 2 wherein the component parts of the stack 11 are illustrated. The stack 11 is formed of a first set of flow plates 23 which is disposed in alternating relation with the second set of flow plates 24. The flow plates 24 are telescoped within a membrane sleeve 25. It is to be understood that the material from which the sleeve 25 is formed will vary depending upon the particular fluids which are intended to flow through the exchange device 10 and the nature of the exchange which is to take place. In the case of the use of the exchange device 10 and its artificial kidney, each sleeve 25 will preferably be formed of tubular cellulose cuprophan membrane.

Considering first the construction of the flow plate 23, it will be seen that adjacent two of the remote corners thereof, the flow plate 23 is provided with openings 26 and 27 which form portions of manifold ports. The end portions of the flow plates 23 are otherwise plain. However, the central portion of each of the flow plates 23 is contoured as at 28 to define flow paths extending transversely of the flow plates 23. It is to be understood that the flow plates 23 are like contoured on opposite surfaces thereof and preferably the contoured portion is in the form of a plurality of adjacent projections which may be of conical, pyramid or other like pointed form. These projections, which are identified by the numeral 30, are preferably arranged in rows whereby there will be a full and uniform fluid flow across each face of each flow plate 23.

Each of the flow plates 24 is provided in the remote corners thereof with openings 31, 32 which are aligned with the openings 26, 27, respectively, and which also form part of the manifold ports. Extending transversely of the flow plate 24 from the opening 32 on one surface only thereof is a pair of parallel grooves 33 which terminate in a through opening 34. A second set of grooves (not shown) similar to the grooves 33 extend along the undersurface of the flow plate 24 to still another through opening 35. A pair of grooves 36 extend longitudinally from the opening 35 on each side of the flow plate 24 to a transversely extending distribution channel 37, there being a distribution channel 37 formed in each surface of the flow plate 24.

The construction at the opposite end of the flow plate 24 is identical with that set forth above, but reversed.

Extending transversely from the opening 31 on the upper surface of the flow plate 24 is a pair of parallel grooves 38 which terminate in a through opening 40. Formed on the underside of the flow plate 24 and extending transversely from the opening 40 is a second pair of parallel grooves (not shown) which terminate in a through opening 41. Formed in the opposite surfaces of the flow plate 24 are relatively short longitudinally extending parallel grooves 42 which are connected to collection chambers 43 formed in the opposite faces of the flow plate 24. The collection chambers 43 are disposed parallel to the distribution channels 37 and are longitudinally spaced therefrom so that fluid flows along the surfaces of the plate 24 is along a major portion of the flow plate 24.

Referring once again to the sleeve 25, it is to be noted that two opposite corners of the sleeve 25 are provided with openings 44, which also form parts of manifold ports.

It is also to be understood that the configurations of the flow plates 23, 24 and the sleeve 25 is such that orientation may be readily accomplished and once the openings in the flow plates and sleeve are aligned, orientation has to be correct.

The flow plates 23 are stacked in alternating relation with the flow plates 24 after each flow plate 24 has been telescoped fully within a sleeve 25. After the stack 11 has been formed in this manner, the manifold plates 12, 13 and 17, 18 are secured in place with respect to the stack. If necessary, a suitable adhesive may be utilized to provide the necessary seal between the manifold plate and the stack 11.

It is to be understood that the fluid flowing into the stack 11 through the fitting 14 is of a higher pressure than the fluid flowing into the stack 11 through the manifold duct 21. As a result, the material of the sleeve 25 is outwardly deformed, as is shown in FIGS. 4 and 5 into the contoured portions 28 of the flow plates 23. However, the contoured portions of the flow plates 23 are such that the material of the sleeve 25 does not completely close the flow patths formed in the flow plates 23. At the same time, the separation of the sleeves 25 from the flow plates 24 results in the formation of other flow paths between the sleeves 25 and the fluid plates 24.

With particular reference to FIG. 5, it will be seen that fluid entering the stack 11 through the manifold plate 18 will pass into the contoured portions 28 of the flow plates 23 in view of the fact that these contoured portions 28 will open entirely through the edges of the flow plates 23. In a like manner, the fluid flowing across the surfaces of the flow plates 23 will exit out through the opposite edges thereof and be collected by the manifold plate 17.

It is to be understood that when the fluid exchange device 10 is in the form of an artificial kidney, blood from the body will enter into the stack 11 through the inlet fitting 14 and exit therefrom through the outlet fitting 15. In a like manner, a suitable dialysate will flow through the stack 11 through the manifold plates 17 and 18. It is to be understood that the pressure of the blood will be higher than the pressure of the dialysate.

On the other hand, it is to be understood that the fluid flow through the stack 11 will be relatively uninhibited so that there will be a minimum pressure drop in the flow of the two fluids through the stacking member.

It will be readily apparent from the foregoing description of the fluid exchange device 10 that after usage, it may be readily disassembled and, if desired, everything except the sleeves 25 may be salvaged. On the other hand, it is to be readily apparent that the flow plates 23 and 24 may be readily and inexpensively formed of suitable materials which are compatible with human blood at such a minimum expense that it is feasible to also dispense with the flow plates once the fluid exchange device 10 has been utilized.

Although only a preferred embodiment of the invention has been specifically illustrated and described herein, it is to be understood that minor variations may be made in the construction of the fluid exchange device without departing from the spirit and scope of the invention, as defined by the appended claims.

I claim:

1. A fluid exchange device comprising a stack of alternating first and second flow plates, the opposite faces of said first flow plates being contoured to define first flow paths thereacross and opposite faces of said second flow plates having planar portions, each of said second flow plates being telescoped within a membrane sleeve with each membrane sleeve having remote portions clamped between adjacent first and second flow plates and deformable outwardly by fluid under pressure within each membrane sleeve partially into said first flow paths to define second flow paths between each membrane sleeve and a respective planar second flow plate face portion, means for flowing a first fluid through said first flow paths and a second fluid through said second flow paths, said second flow plates having remote distribution and collection channels formed in the opposite faces thereof at opposite ends of said planar face portions, said distribution and collection channels being formed adjacent ends of said flow plates with flow of said second fluid being longitudinally of said flowplates, and said first paths being disposed transversely of said flow plates.

2. A fluid exchange device comprising a stack of alternating first and second flow plates, the opposite faces of said first flow plates being contoured to define first flow paths thereacross and opposite faces of said second flow plates having planar portions, each of said second flow plates being telescoped within a membrane sleeve with each membrane sleeve having remote portions clamped between adjacent first and second flow plates and deformable outwardly by fluid under pressure within each membrane sleeve partially into said first flow paths to define second flow paths between each membrane sleeve and a respective planar second flow plate face portions, means for flowing a first fluid through said first flow paths and a second fluid through said second flow paths, and fluid flow on opposite sides of each membrane sleeve portion being in crossing relation.

* * * * *